(12) United States Patent
Weiner et al.

(10) Patent No.: US 7,097,237 B2
(45) Date of Patent: Aug. 29, 2006

(54) PROTECTIVE DOOR FOR DRIVERS' CABINS, IN PARTICULAR FOR UTILITY VEHICLES

(75) Inventors: Uwe Weiner, Düsseldorf (DE); Oliver Schröter, Mülheim (DE)

(73) Assignee: IWS Ingenieurgesellschaft Weine und Schroter mbH, Kamp-Lintfort (DE)

(*) Notice: Subject to any disclaimer, the term of this patent is extended or adjusted under 35 U.S.C. 154(b) by 0 days.

(21) Appl. No.: 10/500,185

(22) PCT Filed: Dec. 18, 2002

(86) PCT No.: PCT/DE02/04652

§ 371 (c)(1),
(2), (4) Date: Jun. 25, 2004

(87) PCT Pub. No.: WO03/057520

PCT Pub. Date: Jul. 17, 2003

(65) Prior Publication Data

US 2005/0012361 A1 Jan. 20, 2005

(30) Foreign Application Priority Data

Dec. 28, 2001 (DE) .......................... 201 20 897 U

(51) Int. Cl.
*B60J 5/04* (2006.01)
*B60R 21/02* (2006.01)

(52) U.S. Cl. ............ 296/190.11; 296/147; 296/146.13; 280/749; 49/56; 49/62

(58) Field of Classification Search ........... 296/190.03, 296/190.11, 146.1, 146.11, 146.5, 146.6, 296/147, 146.13; 49/50, 54, 56, 62, 70, 98; 280/748, 749, 756
See application file for complete search history.

(56) References Cited

U.S. PATENT DOCUMENTS

| | | | |
|---|---|---|---|
| 4,392,660 A | 7/1983 | Mason et al. | |
| 4,431,234 A | 2/1984 | Lacey | |
| 5,951,098 A * | 9/1999 | Waldeck et al. | 296/190.11 |
| 6,149,228 A * | 11/2000 | O'Neill et al. | 296/190.03 |
| 6,299,207 B1 * | 10/2001 | Bares | 280/748 |
| 6,808,038 B1 * | 10/2004 | Schneider | 180/271 |
| 6,811,209 B1 * | 11/2004 | Woollett et al. | 296/190.11 |
| 6,890,036 B1 * | 5/2005 | Wiener et al. | 297/487 |
| 6,902,024 B1 * | 6/2005 | Miiller et al. | 180/271 |

FOREIGN PATENT DOCUMENTS

| | | | |
|---|---|---|---|
| EP | 0 992 382 A2 | | 4/2000 |
| JP | 62166139 A | | 7/1987 |
| JP | 06262949 A | * | 9/1994 |
| JP | 10 129992 A | | 5/1998 |
| JP | 11170926 | | 6/1999 |

* cited by examiner

*Primary Examiner*—Patricia L. Engle
(74) *Attorney, Agent, or Firm*—Foley & Lardner LLP

(57) ABSTRACT

Disclosed is a protective door for drivers' cabins, in particular for utility vehicles. The design achieves maximum flexibility for protecting the driver both against influences of weather and injury. The protective door has a first door element, with a restraining arrangement, which can be locked on a front pillar of a driver's cab for securing against the driver falling out laterally. Further included is a weather protection unit for the door.

24 Claims, 3 Drawing Sheets

PROTECTIVE DOOR FOR DRIVERS' CABINS, IN PARTICULAR FOR UTILITY VEHICLES

Figure 1:
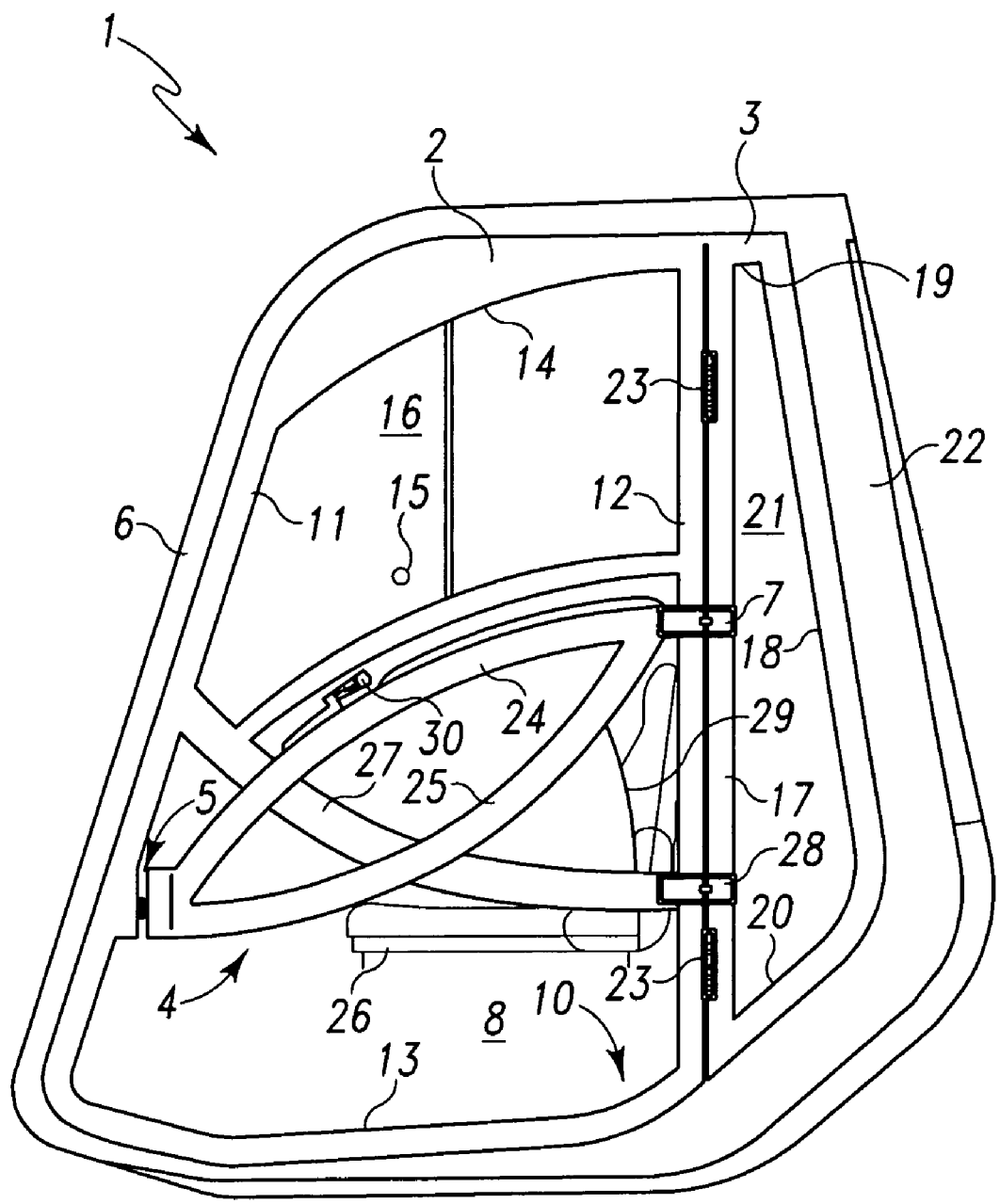

The invention relates to a protective door for drivers' cabins, in particular for utility vehicles.

Such protective doors are used, for example, in fork-lift trucks for protecting the driver against injury, in particular in the case of load- and centrifugal-force-induced accidents or carriageway-induced tilting.

EP 0 992 382 A2 discloses a restraining arrangement for commercial vehicles in the case of which there is provided, in a laterally open protective roof, a restraining bracket which has one end section articulated on a rear pillar via a hinge and can have its other end section secured on a front pillar in a closed position. By means of such a restraining arrangement, the driver is protected to a certain extent against the hazards which arise in the event of an accident, but the laterally open protective roof does not protect the driver in any way against the influences of bad weather.

In order to protect the driver against the influences of bad weather, closed drivers' cabs in which the driver is largely protected against falling out laterally in the case of carriageway- or accident-induced tilting of the vehicle are known. Such drivers' cabs, however, have the disadvantage that, in the case of hot weather, the door is usually opened, or even removed, by the driver in order to create pleasant temperature conditions in the cab interior, this resulting in the vehicle no longer be safe in the event of an accident and thus not complying with regulations.

The object of the present invention is thus to provide a protective door for drivers' cabins, in particular utility vehicles, which has maximum flexibility for protecting the driver both against the influences of weather and against injury.

This object is achieved according to the feature of independent claim 1.

For this purpose, a protective door according to the invention has a first door element, which has a restraining arrangement, which can be locked on a front pillar of a driver's cab and is intended for securing against the driver falling out laterally, and a weather-protection unit, and also has a second door element, which is adjacent to the first door element, on which the restraining arrangement is articulated such that it can be pivoted via a first hinge, and which can be fastened on a rear pillar of the driver's cab, it being the case that the weather-protection unit of the first door element is articulated on the second door element such that it can be pivoted through preferably 180°, via a second hinge, between a closed position and a pivoted-open position, independently of the restraining arrangement.

Since, in the case of the protective door according to the invention, a first door element, which has the restraining arrangement and the weather-protection unit, and a second door element, which is separate from the first and is articulated on the restraining arrangement such that it can be pivoted via a hinge, are provided, the weather-protection unit being articulated on the second door element such that it can be pivoted independently of the restraining arrangement, it is possible for the driver to handle the weather-protection unit independently of the restraining arrangement, with the result that maximum flexibility is provided in respect of the measures for protecting against the influences of bad weather and injury in the event of accidents. It is possible, in particular, for the driver, in the case of hot weather, to work with the weather-protection unit in the pivoted-open position without this being detrimental to the protective action of the restraining arrangement. In order to protect against the influences of bad weather, the driver can work with the weather-protection unit and restraining arrangement closed and can open the same merely for the purposes of getting in and out.

Since the weather-protection unit itself does not have to perform any protective function in the event of accidents, it may be of lightweight configuration.

As a result of the protective door being divided up into a first door element and a second door element, the restraining arrangement and the weather-protection unit may be of reduced width in comparison with the overall door width, as a result of which it is easy to open and close and can be removed, in particular, even by just one person, this resulting in convenient handling overall.

According to a preferred embodiment, the second door element can be articulated in a pivoted manner on a rear pillar of the driver's cab. This makes it easier for servicing to be carried out in the driver's cab since, in addition to the first door element, it is also possible for the second door element to be opened to the full extent.

Means are preferably provided for fixing the weather-protection unit in the pivoted-open position, with the result that the driver can quickly and straightforwardly alter the function of the protective door if the weather is changeable.

According to a further preferred embodiment, the weather-protection unit is articulated on the second door element via the second hinge such that it can be fitted thereon or removed therefrom. Possible damage, in particular, may be counteracted as a result.

The weather-protection unit preferably has a sliding window and is preferably produced, at least in part, from polycarbonate, which, on the one hand, ensures optimum visibility and, on the other hand, has a relatively low weight, and is also scratch-resistant and UV-resistant.

According to a further preferred embodiment, the restraining arrangement has an ellipsoidal bracket frame comprising a top elliptical bracket and a bottom elliptical bracket, it being the case that the elliptical brackets of the ellipsoidal bracket frame, which are connected to one another at their ends, are articulated on the second door element above the backrest of a driver's seat of the driver's cab such that they can be pivoted by means of the first hinge, and they can be locked on the front pillar, level with the seat surface of the driver's seat, by means of a locking device.

This ensures that the driver's arm, body and leg regions are laterally protected irrespective of the driver's height. The hip, knee and shoulder points are protected for all heights of driver by the adapted radii of the ellipsoidal bracket frame.

In order to reduce the risk of injury, the ellipsoidal bracket frame is preferably produced from a rectangular profile.

A further preferred embodiment provides, for the purposes of increasing the rigidity and of increasing the driver's protection, a retaining bracket which starts approximately in the centre of the bottom bracket of the ellipsoidal bracket frame and is articulated on the pillar beneath the first hinge, approximately level with the region of transition between the backrest and cushion of the vehicle seat, via a further hinge. In the case of this embodiment, the rigidity of the system is yet further increased, and in addition the driver's pelvic region is protected, by the retaining bracket. Furthermore, in the case of this embodiment, the vehicle driver's freedom of movement is not restricted since there is sufficient freedom of movement for the elbows between the retaining bracket and the two elliptical brackets.

According to a further preferred embodiment, the retaining bracket is extended further beyond the bottom elliptical bracket, with the result that it is secured on the top elliptical bracket. This embodiment results in increased torsional rigidity of the ellipsoidal bracket. It is also advantageous in the case of this embodiment if a hip pad is provided between the bottom elliptical bracket and the retaining bracket. It is possible here for the hip pad preferably to have means for increasing the rigidity and, for this purpose, to be fitted, for example, on a triangular sheet-metal protective plate provided with a securing means.

According to a further preferred embodiment, an actuating element for the locking device is provided on the top elliptical bracket, preferably in the region of transition between the top elliptical bracket and retaining bracket.

The fastening arrangement and the hinges used according to the invention are preferably configured as screw fastenings or clamping fastenings, with the result that the securing arrangement according to the invention can easily be retrofitted.

Figure 2A:
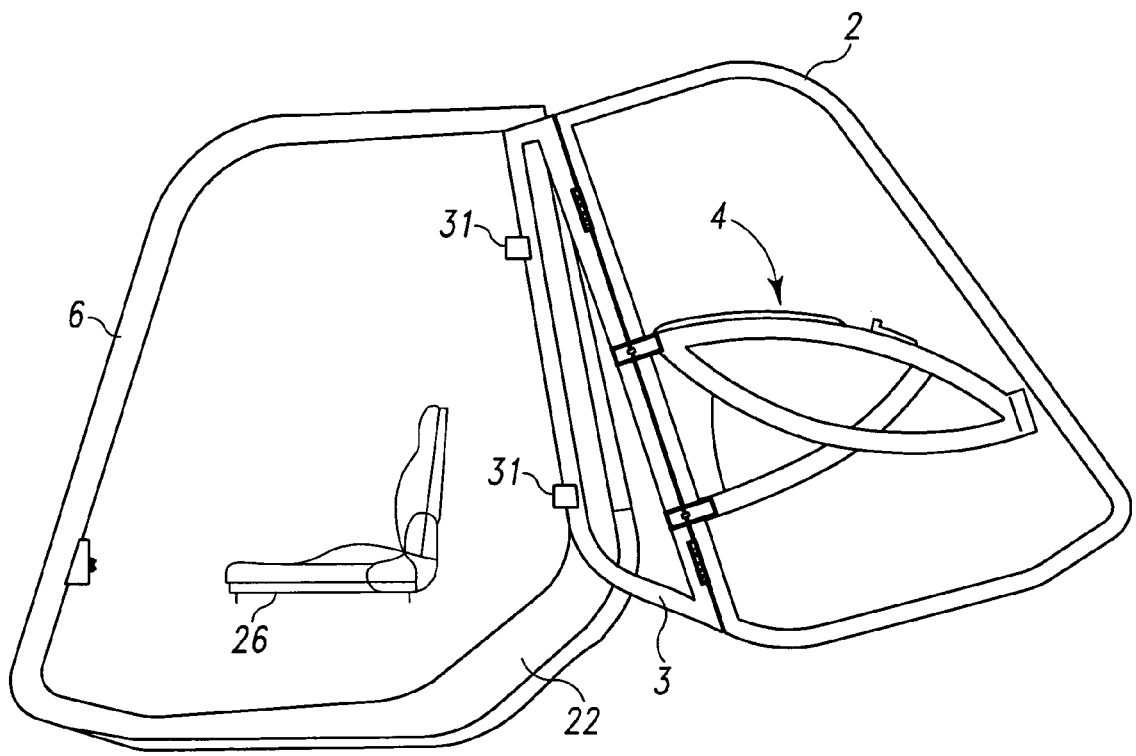

The invention is explained in more detail hereinbelow with reference to an exemplary embodiment illustrated in the attached drawings, in which:

FIG. 1 shows a schematic side view of a protective door according to the invention for drivers' cabs; and FIGS. 2a)–d) show different operational and opening variants of the protective door according to the invention from FIG. 1.

A protective door 1 according to the invention is illustrated schematically in side view according to FIG. 1. The protective door 1 is suitable, in particular, for drivers' cabs in all kinds of commercial vehicle, such as fork-lift trucks, tractors and construction and agricultural machinery, and has a first door element 2 and a second door element 3.

The first door element 2 has a restraining arrangement 4, which is locked on a front pillar 6 via a locking device 5. The locking device 5 may preferably be a snap-action catch, a rotary catch or the like. The front pillar 6 may be, for example, the A-pillar of a driver's cab. On its side which is directed away from the locking device 5, the restraining arrangement 4 is articulated on the second door element 3 such that it can be pivoted via a first hinge 7.

Furthermore, the first door element 2 has a weather-protection unit 8 which, in the exemplary embodiment illustrated, is designed as a weather-protection panel 9 which is made of polycarbonate and is encased in a frame 10 which is made of steel and has lateral struts 11, 12 and bottom and top struts 13, 14, respectively. On its side which is directed towards the top strut 14, the weather-protection panel 9 is subdivided for the purpose of forming a sliding window 16 provided with a handle 15.

The frame 10 of the weather-protection unit 8 is articulated on the adjacent lateral strut 17 of the second door element 3 such that it can be pivoted via a second hinge 23. The second door element 3 has a panel 21, which is encased between lateral struts 17, 18 and top and bottom struts 19, 20, respectively, and is preferably likewise produced from polycarbonate, and it is articulated on a rear pillar 22, for example the B-pillar of the driver's cab, such that it can be pivoted via a third hinge 31 (which can be seen from FIG. 2a).

The preferred configuration of the restraining arrangement 4 which is provided in the case of the exemplary embodiment illustrated is described in more detail hereinbelow.

According to FIG. 1, the restraining arrangement 4 is designed as an ellipsoidal bracket frame with a top elliptical bracket 24 and a bottom elliptical bracket 25. The elliptical brackets 24, 25 of the ellipsoidal bracket frame, which are connected to one another at their ends, are articulated on the second door element 3 above the backrest of a driver's seat 26 of the drivers cab such that they can be pivoted by means of the hinge 7, and they can be locked on the front pillar 6, level with the seat surface of the driver's seat 26, via the locking device 5.

The restraining arrangement 4, furthermore, has a retaining bracket 27 which starts approximately in the centre of the bottom elliptical bracket 25 and is articulated on the lateral strut 17 in the second door element 3, beneath the first hinge 7, via a fourth hinge 28. The retaining bracket 27 is extended beyond the bottom elliptical bracket 25 to the top elliptical bracket 24 and secured on the top elliptical bracket 24. The retaining bracket 27, the bottom elliptical bracket 25 and the top elliptical bracket 24 preferably have a rectangular cross section.

Preferably provided between the bottom elliptical bracket 25 and the retaining bracket 27 is a hip pad 29, which is preferably fitted on a protective plate which is produced from sheet metal and provided with a securing means for the hip pad 29. Moreover, an actuating element 30 for the locking device 5 is provided on the top elliptical bracket 24, preferably in the region of transition between the top elliptical bracket 24 and retaining bracket 27.

According to FIGS. 2a–d, different operating variants can easily be realized by means of the protective door 1 according to the invention.

It is thus possible, according to FIG. 2a, for the first and second door elements 2, 3 to be swung open together, for example for carrying out servicing work in the driver's cab, by virtue of releasing the locking device 5 and pivoting open the second door element 3 in relation to the rear pillar 22.

Figure 2B:
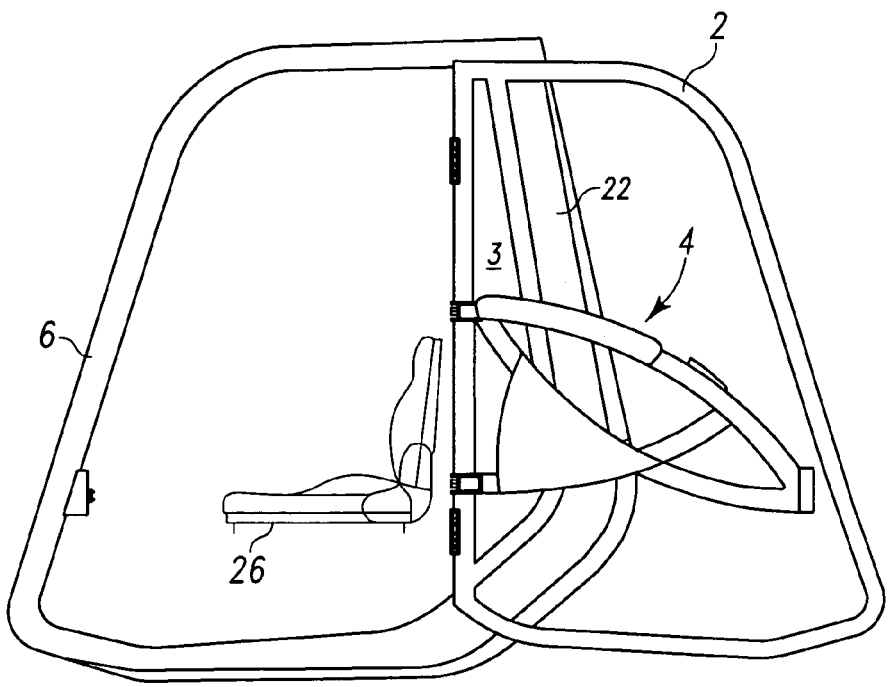

According to FIG. 2b, it is also possible, with the second door element 3 fixed, to pivot open just the first door element 2, together with the restraining arrangement 4, by means of the hinges 7 and 28 in order to get into or out of the driver's cab.

Figure 2C:
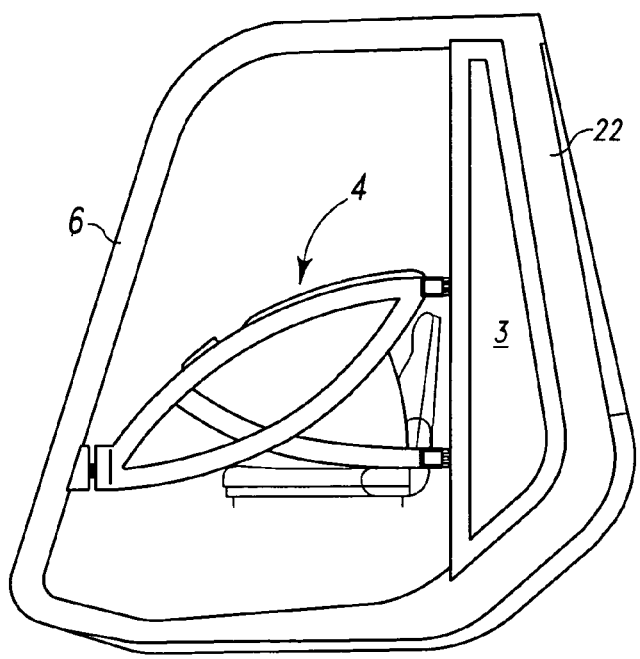
Figure 2D:
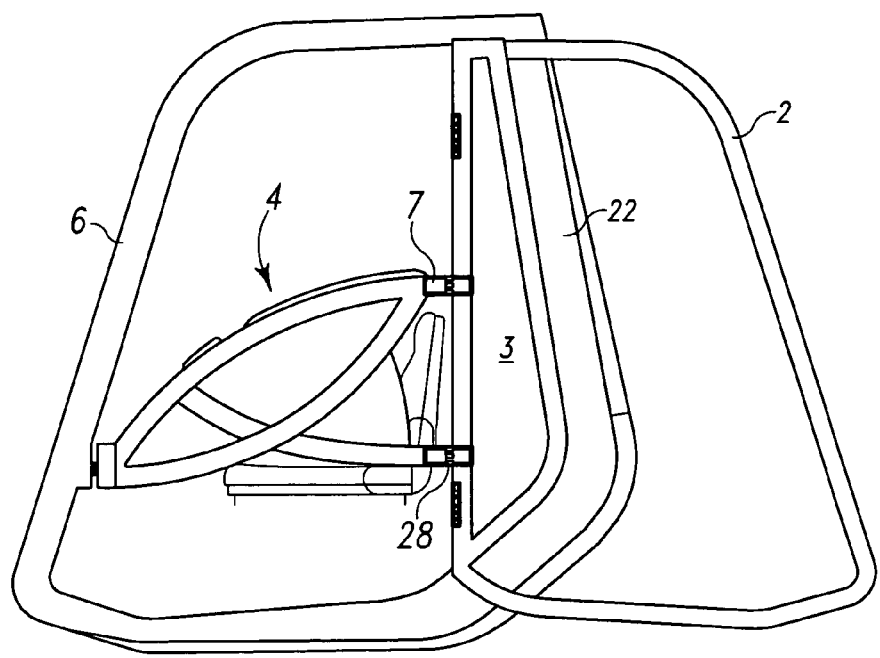

According to FIG. 2d, it is also possible for the weather-protection unit 8 to be pivoted open through approximately 180°, in respect of the hinges 7, 28, independently of the restraining arrangement 4 and to be fixed in this position, for example on a locking device provided on the vehicle, or also, according to FIG. 2c, to be removed altogether as a "fair-weather solution".

The protective door according to the invention thus has maximum flexibility in respect of the possible operational variants, since the driver can handle a weather-protection unit independently of a restraining arrangement, which serves for protecting against injury. The special configuration of the restraining arrangement with an ellipsoidal bracket frame ensures that it reliably protects the driver against injury irrespective of his/her height.

The invention claimed is:

1. Protective door for a driver's cabins, having
   a first door element (2), which has a restraining arrangement (4), which can be locked on a front pillar (6) of a driver's cab and is intended for securing against the driver falling out laterally, and a weather-protection unit (8); and
   a second door element (3), which is adjacent to the first door element (2), on which the restraining arrangement (4) is articulated such that it can be pivoted via a first hinge (7), and which can be fastened on a rear pillar (22) of the driver's cab;
   it being the case that the weather-protection unit (8) of the first door element (2) is articulated on the second door element (3) such that it can be pivoted through preferably 180°, via a second hinge (23), between a closed position and a pivoted-open position, independently of the restraining arrangement (4).

2. Protective door according to claim 1, it being the case that the second door element (3) is articulated on the rear pillar (22) of the driver's cab such that it can be pivoted via a third hinge (31).

3. Protective door according to claim 1 or 2, it being the case that means are provided for fixing the weather-protection unit (8) in the pivoted-open position.

4. Protective door according to one of claim 1 or 2, it being the case that the weather-protection unit (8) is articulated on the second door element (3) via the second hinge (23) such that it can be fitted thereon or removed therefrom.

5. Protective door according to claim 1, it being the case that the weather-protection unit (8) has a sliding window (16).

6. Protective door according to claim 1, it being the case that the weather-protection unit (8) is produced, at least in part, from polycarbonate.

7. Protective door according to one of claims 1, 5 or 6, it being the case that the restraining arrangement (4) has an ellipsoidal bracket frame comprising a top elliptical bracket (24) and a bottom elliptical bracket (25), and that the elliptical brackets (24, 25) of the ellipsoidal bracket frame, which are connected to one another at their ends, are articulated on the second door element (3) above the backrest of a driver's seat (26) of the driver's cab such that they can be pivoted by means of the first hinge (7), and they can be locked on the front pillar (6), level with the height of the seat surface of the driver's seat (26), by means of a locking device (5).

8. Protective door according to claim 7, it being the case that the restraining arrangement (4) additionally has a retaining bar (27) which starts approximately in the centre of the bottom elliptical bracket (25) of the ellipsoidal bracket frame and is articulated on the second door element (3), beneath the first hinge (7), via a fourth hinge (28).

9. Protective door according to claim 8, it being the case that additionally provided between the bottom elliptical bracket (25) and the retaining bracket (27) is a hip pad (29).

10. Protective door according to claim 9, wherein the hip pad is provided with rigidity increasing means.

11. Protective door according to claim 8, it being the case that an actuating element (30) for the locking device (5) is provided on the top elliptical bracket (24).

12. Protective door according to claim 9, it being the case that the retaining bracket (27), bottom elliptical bracket (25) and top elliptical bracket (24) have a rectangular cross section.

13. Driver's cab with a protective door according to claim 9.

14. Protective door according to claim 8, it being the case additionally provided between the bottom elliptical bracket (25) and the retaining bracket (27) is a hip pad (29); and that additionally provided between the bottom elliptical bracket (25) and the retaining bracket (27) is a hip pad (29), which are preferably provided with rigidity-increasing means;

that the retaining bracket (27) is extended beyond the bottom elliptical bracket (25) to the top elliptical bracket (24) and secured on the top elliptical bracket (24).

15. Protective door according to claim 14, it being the case that an actuating element (30) for the locking device (5) is provided on the top elliptical bracket (24).

16. Protective door according to claim 14, it being the case that the retaining bracket (27), bottom elliptical bracket (25) and top elliptical bracket (24) have a rectangular cross section.

17. Driver's cab with a protective door according to claim 14.

18. Protective door according to claim 8, it being the case that an actuating element (30) for the locking device (5) is provided on the top elliptical bracket (24).

19. Protective door according to claim 18, it being the case that the retaining bracket (27), bottom elliptical bracket (25) and top elliptical bracket (24) have a rectangular cross section.

20. Protective door according to claim 8, it being the case that the retaining bracket (27), bottom elliptical bracket (25) and top elliptical bracket (24) have a rectangular cross section.

21. Driver's cab with a protective door according to claim 8.

22. Driver's cab with a protective door according to one of claim 1 or 2.

23. Vehicle with a driver's cab according to claim 22.

24. Protective door according to claim 1, wherein the driver's cabin is in a utility vehicle.

* * * * *